| United States Patent Office | 2,838,373
| --- | --- |
| | Patented June 10, 1958 |

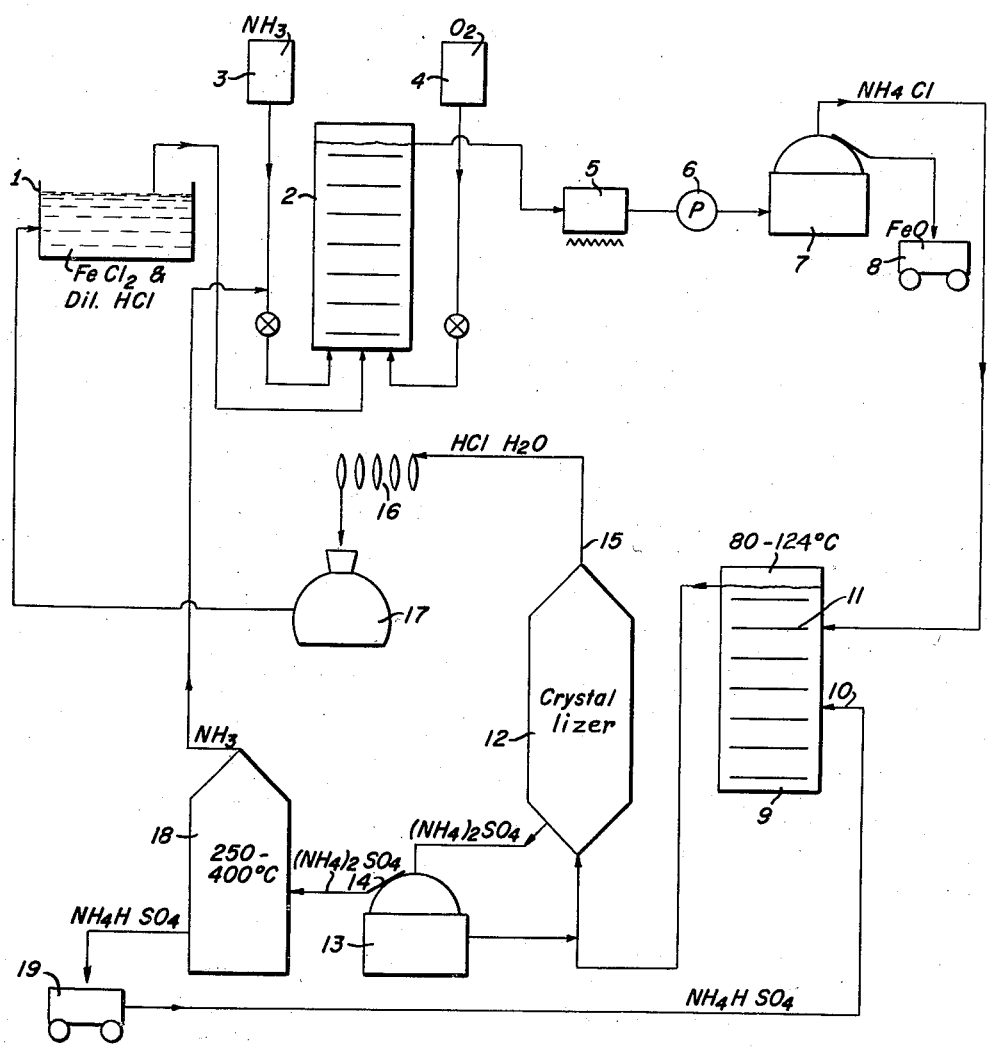

2,838,373

METHOD FOR TREATMENT OF SPENT HYDROCHLORIC ACID PICKLE LIQUOR FOR THE RECOVERY OF IRON OXIDE, AMMONIUM SULPHATE AND HYDROCHLORIC ACID

Charles D. Stricker, Shaker Heights, Ohio, assignor to United States Steel Corporation, a corporation of New Jersey Application May 23, 1956, Serial No. 586,810

2 Claims. (Cl. 23—119)

This invention relates to the treatment of spent pickle liquor and, in particular, to the treatment of hydrochloric-acid liquor in such manner as to recover hydrochloric acid and iron oxide.

This is a continuation-in-part of my application Serial No. 489,135, filed February 18, 1955.

Hydrochloric acid is used extensively as a pickling agent in the steel industry. It is more expensive than sulphuric acid, the other common pickling agent, but the latter is not satisfactory for all pickling operations. The disposal of spent liquor, whether hydrochloric-acid or sulphuric-acid, remains a serious problem, despite many previous proposals for the treatment thereof.

I have invented a process for treating spent hydrochloric-acid liquor so as to recover all the solute in readily usable form, i. e., as iron oxide and hydrochloric acid. Briefly, my process includes treating the spent liquor with ammonia and oxygen to precipitate iron oxide and leave a solution of ammonium chloride. I then react the chloride solution with ammonium bisulphate to produce a mixed solution of ammonium sulphate and hydrochloric acid. From this solution, I boil off the hydrogen chloride and crystallize the ammonium sulphate. The hydrogen chloride vapor, when condensed, is available for use in making up fresh pickle liquor and the ammonium sulphate may be decomposed by heat into ammonia and ammonium bisulphate for use in treating more spent liquor.

A complete understanding of the invention may be obtained from the following detailed description thereof with reference to the accompanying drawing which is a diagrammatic representation of the several apparatus units involved in a continuous treating system utilizing the invention.

Referring now in detail to the drawing, a pickling tank 1 contains the waste liquor to be treated. The liquor, of course is a solution of ferrous chloride and hydrochloric acid in water. A suitable volume of liquor is pumped from tank 1 to a reaction chamber 2 where gaseous ammonia and air are bubbled therethrough from sources 3 and 4, respectively. The ammonia must be supplied in sufficient amount to neutralize the acid and convert the ferrous chloride to ammonium chloride, and the air in sufficient amount that the oxygen thereof oxidizes the ferrous ions to iron oxide which is precipitated from solution. The details of a practice suitable for use at this stage are given in Hoak Patent No. 2,529,874, dated November 14, 1950. By adding proper amounts of air along with the ammonia, much of the ferrous iron is converted to ferric. By the correct proportioning of the reactants and air, rapid settling ferroso-ferric hydrated oxide is formed, with complete precipitation of iron at pH 7.5 to 8.0. The ferric to ferrous ratio should be kept between 2:1 to 3.5:1.

The slurry resulting from the ammoniation and oxidation is pumped from chamber 2 through a heater 5 by pump 6 to a continuous filter 7. The heater raises the temperature of the slurry to a point at which the ammonium chloride is fully dissolved. This depends on the concentration of the chloride in slurry. Filter 7 separates the precipitated iron oxide from the ammonium chloride solution. The oxide is collected in any suitable container, such as a vehicle 8, for removal. It is in immediately usable form for purposes such as sinter feed. A settling tank may be used for separation instead of the filter 7.

The ammonium chloride flows to a reactor 9 heated by steam to a temperature between 80 and 124° C. Ammonium bisulphate is supplied continuously to chamber 9 through a connection 10, at the same molar rate as the chloride. The chamber has baffles 11 therein to effect thorough mixing. The reactions in chamber 9 are:

$$NH_4Cl + NH_4HSO_4 \rightleftarrows 2NH_4^+ + H^+ +$$
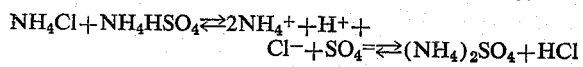
$$Cl^- + SO_4^= \rightleftarrows (NH_4)_2SO_4 + HCl$$

The hot solution passes from chamber 9 to a crystallizer 12 where it is concentrated by evaporation. A slurry of ammonium sulphate crystals formed in crystallizer 12 is delivered to a continuous vacuum filter 13 which separates the crystals at 14 and returns solution to the crystallizer. Hydrogen chloride and water vapor boiled off from the solution leave the crystallizer through a connection 15. The vapors are condensed in cooling coils 16 and collect as pure hydrochloric acid in a container 17, from which the acid may be returned to the pickling tank for making up a fresh batch of liquor.

Solid ammonium sulphate from filter 13 is delivered to a dissociation chamber 18 heated to a temperature between 250 and 400° C. At that temperature, the sulphate decomposes into ammonia and ammonium bisulphate. The bisulphate is collected in a container 19 and is available for use in treating further amounts of ammonium chloride in chamber 9. Ammonia gas leaving chamber 18 is available for similar use in chamber 2.

It will be apparent from the foregoing that the invention provides a simple and effective method for the treatment of spent hydrochloric-acid pickle liquor, having several important advantages. In the first place, it results in no by-products requiring disposal since both the acid and iron oxide produced are usable as such in steel plants. This entirely obviates the problem of disposing of spent liquor and improves the overall economy of the operation. The addition agents are likewise recovered in their original form so there is no cost for materials used, once the method has been instituted.

Although I have disclosed herein the preferred embodiment of my invention, I intend to cover as well any change of modification therein which may be made without departing from the spirit and scope of the invention.

I claim:

1. In a method of recovering spent hydrochloric-acid pickle liquor, the steps including introducing ammonia and oxygen into the liquor thereby to convert it to a complex ferroso-ferric hydrated oxide and an aqueous solution of ammonium chloride, collecting the oxide and reacting the chloride solution with ammonium bisulphate at a temperature of from 80 to 124° C. to produce a mixed solution of ammonium sulphate and hydrochloric acid, then boiling off the hydrogen chloride and crystallizing the sulphate from the last mentioned solution.

2. In a method as defined in claim 1 characterized by heating the ammonium sulphate to decompose it into ammonia and ammonium bisulphate, then using these decomposition products in the treatment of more spent pickle liquor.

References Cited in the file of this patent

UNITED STATES PATENTS 2,529,874    Hoak _____ Nov. 14, 1950

OTHER REFERENCES

Mellor, "Comprehensive Treatise on Inorganic and Theoretical Chemistry," vol. 2, Longmans, Green & Co., New York, N. Y., 1922, page 164.